United States Patent
Thor et al.

(10) Patent No.: US 10,124,809 B2
(45) Date of Patent: Nov. 13, 2018

(54) METHOD, ARRANGEMENT AND SYSTEM FOR ESTIMATING VEHICLE CORNERING STIFFNESS

(71) Applicant: VOLVO CAR CORPORATION, Gothenburg (SE)

(72) Inventors: Mikael Thor, Gothenburg (SE); Tony Gustafsson, Askim (SE)

(73) Assignee: Volvo Car Corporation, Gothenburg (SE)

( * ) Notice: Subject to any disclaimer, the term of this patent is extended or adjusted under 35 U.S.C. 154(b) by 106 days.

(21) Appl. No.: 15/042,683

(22) Filed: Feb. 12, 2016

(65) Prior Publication Data
US 2016/0244068 A1    Aug. 25, 2016

(30) Foreign Application Priority Data
Feb. 20, 2015  (EP) .................................. 15155851

(51) Int. Cl.
*B60W 40/101*   (2012.01)
*B60T 8/1755*   (2006.01)

(52) U.S. Cl.
CPC ....... *B60W 40/101* (2013.01); *B60T 8/17551* (2013.01); *B60T 2230/02* (2013.01);
(Continued)

(58) Field of Classification Search
None
See application file for complete search history.

(56) References Cited

U.S. PATENT DOCUMENTS

| | | | |
|---|---|---|---|
| 6,549,842 B1 * | 4/2003 | Hac .................... | B60T 8/172 701/73 |
| 7,774,103 B2 | 8/2010 | Deng et al. | |

(Continued)

FOREIGN PATENT DOCUMENTS

| | | |
|---|---|---|
| DE | 10215464 | 10/2003 |
| DE | 102008030667 | 1/2009 |
| WO | 2013087169 | 6/2013 |

OTHER PUBLICATIONS

Extended European Search Report for European Application No. 15155851.7, Completed by the European Patent Office, dated Jul. 27, 2015, 6 Pages.

*Primary Examiner* — David P. Merlino
(74) *Attorney, Agent, or Firm* — Brooks Kushman P.C.

(57) ABSTRACT

A method, arrangement and system are described for estimating one or more vehicle cornering stiffness parameters ($c_f$, $c_r$) in a linear vehicle operating region. The method includes reading sensor data representative of at least vehicle (1) longitudinal velocity ($v_x$), vehicle lateral acceleration ($a_y$), vehicle yaw rate ($\omega_z$) and vehicle steering angle ($\delta$), determining from the read sensor data if the cornering stiffness parameters ($c_f$, $c_r$) are observable, and if so providing an estimate of the cornering stiffness parameters ($c_f$, $c_r$) using a bicycle model that includes a model of tire relaxation dynamics.

11 Claims, 3 Drawing Sheets

(52) U.S. Cl.
CPC ...... *B60T 2270/86* (2013.01); *B60W 2510/20* (2013.01); *B60W 2520/10* (2013.01); *B60W 2520/125* (2013.01); *B60W 2520/14* (2013.01); *B60W 2530/10* (2013.01); *B60W 2720/00* (2013.01)

(56) References Cited

U.S. PATENT DOCUMENTS

| | | | | |
|---|---|---|---|---|
| 9,340,211 B1* | 5/2016 | Singh | ................. | B60W 40/068 |
| 2004/0193345 A1* | 9/2004 | Chen | ................. | B62D 6/003 |
| | | | | 701/42 |
| 2005/0154513 A1* | 7/2005 | Matsunaga | ......... | B60W 40/101 |
| | | | | 701/38 |
| 2005/0278077 A1* | 12/2005 | Shin | .................... | B60W 30/02 |
| | | | | 701/1 |
| 2007/0027586 A1* | 2/2007 | Deng | .................... | B60T 8/172 |
| | | | | 701/1 |
| 2007/0095593 A1* | 5/2007 | Peterson | ............. | B60W 40/103 |
| | | | | 180/248 |
| 2007/0233352 A1* | 10/2007 | Miyashita | ............. | B60W 40/12 |
| | | | | 701/82 |
| 2008/0086248 A1* | 4/2008 | Lu | ....................... | B60W 40/101 |
| | | | | 701/41 |
| 2008/0086251 A1* | 4/2008 | Lu | ........................ | B60T 8/1755 |
| | | | | 701/38 |
| 2008/0243446 A1* | 10/2008 | Miyashita | ........... | G06F 17/5009 |
| | | | | 703/1 |
| 2010/0131145 A1* | 5/2010 | Ryu | ....................... | B60T 8/172 |
| | | | | 701/31.4 |
| 2010/0131229 A1* | 5/2010 | Nardi | ..................... | B60T 8/172 |
| | | | | 702/142 |
| 2012/0109458 A1* | 5/2012 | Sidlosky | ............... | B60W 40/114 |
| | | | | 701/41 |
| 2014/0350818 A1 | 11/2014 | Obermuller | | |
| 2017/0010184 A1* | 1/2017 | Singh | ..................... | B60C 19/00 |

* cited by examiner

METHOD, ARRANGEMENT AND SYSTEM FOR ESTIMATING VEHICLE CORNERING STIFFNESS

CROSS-REFERENCE TO RELATED APPLICATIONS

This application claims foreign priority benefits under 35 U.S.C. § 119(a)-(d) to European patent application number EP 15155851.7, filed Feb. 20, 2015, which is incorporated by reference in its entirety.

TECHNICAL FIELD

The present disclosure relates to a method for estimating one or more vehicle cornering stiffness parameters in a linear vehicle operating region. The disclosure further relates to an arrangement and system for estimating one or more vehicle cornering stiffness parameters in a linear vehicle operating region.

BACKGROUND

Several vehicle control systems, which are used to augment the driving capability of a vehicle operator, currently exist. Those control systems include stability control systems. Example stability control systems are electronic stability control (ESC) systems or sometimes referred to as yaw stability control (YSC) systems. Systems of this kind are also sometimes called ESP (Electronic Stability Program) systems or DSTC (Dynamic Stability Traction Control) systems.

The stability control systems are utilized to maintain controlled and stable vehicle operations for improved vehicle and occupant safety. The stability control systems are often used to maintain control of a vehicle following a desired travel direction, to prevent the vehicle from spinning out and help the driver maintain directional stability when cornering.

This function is usually enabled by braking one or more of the wheels if a lateral slide or skidding is detected, but may also be achieved through reducing engine torque, or varying the driving torque at individual wheels or axles so as to generate an active tire force difference.

Interventions as above are usually performed as a function of yaw rate error, where the yaw rate error is determined as the difference between a yaw rate target and a sensed yaw rate. The yaw rate target is normally calculated from a steering wheel angle, which may be considered indicative of the driver intent, and the vehicle velocity using a single track vehicle model, also called bicycle model.

Existing stability control systems are designed to correct undesired vehicle motion caused by variations in tire cornering stiffness. Cornering stiffness is a tire property that describes the cornering behavior of a vehicle tire by relating its side slip angle to a produced lateral friction force.

A challenge related to cornering stiffness is that it may vary significantly for different tires, e.g. a summer tire vs. a winter tire or a low profile tire vs. a high profile tire, but it also varies as the tire ages. For active safety stability control systems, such as e.g. an AYC, ESC, ESP, or YSC system, these variations may cause problems as the vehicle's true handling characteristics change over time. Such variations are likely to cause unnecessary system interventions.

Hence, it is of interest to estimate cornering stiffness online in order to counteract such issues.

It is previously known to account for variations in tire cornering stiffness, as e.g. exemplified by document U.S. Pat. No. 7,774,103, which discloses a system for estimating vehicle side-slip in the linear vehicle operating region is disclosed that includes updating front and rear cornering stiffness parameters. The system includes a first state observer processor that employs a bicycle model for generating yaw acceleration and lateral acceleration signals. The first state observer processor receives sensor signals from a vehicle speed sensor and a hand-wheel angle sensor. The system calculates yaw acceleration and lateral acceleration and compares them to measured yaw rate and lateral acceleration signals to generate yaw acceleration and lateral acceleration error signals. The error signals are sent to a parameter estimation processor that calculates an updated front cornering stiffness and rear cornering stiffness, e.g. using recursive least squares (RLS) parameter estimation. The updated front and rear cornering stiffness are sent back to the first state observer processor, and are used by a second state observer processor for generating the estimated vehicle side-slip.

However, although U.S. Pat. No. 7,774,103 discloses a general concept for providing updated front and rear cornering stiffness's, the process of determining the updated front cornering stiffness and rear cornering stiffness by the state observer processor and the parameter estimation processor according to U.S. Pat. No. 7,774,103 is a slow loop, and provides the updated signals on the order of about one to two seconds.

Thus, although U.S. Pat. No. 7,774,103 suggest a slow loop process of determining updated front cornering stiffness and rear cornering stiffness estimates providing an improved ability to account for variations in tire cornering stiffness there is room for still further improvements.

SUMMARY

Embodiments herein aim to provide an improved method for estimating one or more vehicle cornering stiffness parameters in a linear vehicle operating region.

This is provided through a method that comprises the steps of: reading sensor data representative of at least vehicle longitudinal velocity, vehicle lateral acceleration, vehicle yaw rate and vehicle steering angle; determining from the read sensor data if the cornering stiffness parameters are observable; and if so providing an estimate of the cornering stiffness parameters using a bicycle model that includes a model of tire relaxation dynamics.

According to a second embodiment the step of determining cornering stiffness parameter observability further comprises: determining if the vehicle longitudinal velocity exceeds a minimum threshold; determining if the vehicle lateral acceleration is below a maximum threshold; determining if the vehicle yaw rate exceeds a minimum threshold; and determining if the vehicle steering angle exceeds a minimum threshold.

The provision of such easily quantifiable conditions on the measured signals simplifies the task of making sure that the cornering stiffness parameters are observable, i.e. that sufficient excitation for observability exists.

According to a third embodiment the step of providing an estimate of the cornering stiffness parameters further comprises formulating and solving a weighted linear least squares problem using a standard recursive least squares approach.

The provision of formulating and solving a weighted linear least squares problem using a standard recursive least squares approach provides a simple and proven approach for solving estimation problems of this kind.

According to a fourth embodiment the weighted linear least squares problem in order to involve the cornering stiffness parameters and tire relaxation dynamics is formulated based on a description of the vehicle's lateral motion that includes a relation between a slip angle and a lateral tire force at the center of a tire and a slip angle and a lateral tire force at the point of contact between that tire and the road.

The provision of including a relation between a slip angle and a lateral tire force at the center of a tire and a slip angle and a lateral tire force at the point of contact between that tire and the road especially facilitates taking into account the effects of tire relaxation dynamics for providing an improved estimate.

According to a fifth embodiment the description of the vehicle's lateral motion includes a first order filter model for the relation between the slip angle and the lateral tire force at the center of a tire and the slip angle and the lateral tire force at the point of contact between that tire and the road according to:

$$\alpha_f^t = H(s)\alpha_f$$

$$\alpha_r^t = H(s)\alpha_r$$

where $$H(s) = \frac{1}{1+s\tau}$$

and the notation with an exponent or superscript t, $(term)^t$, indicates that the term is expressed in a tire coordinate system.

The provision of the above first order filter model provides a simple model accounting for the relaxation length of a tire, which is a property that describes the delay between when a slip angle is introduced and when the resulting lateral force reaches its steady-state value.

According to a sixth embodiment the description of the vehicle's lateral motion is defined as $$c_f H(s)\left(\delta - \omega_z \frac{l_f + l_r}{v_x}\right) + \frac{c_f(ml_f a_y - I_z \dot{\omega}_z)}{c_r(l_f + l_r)} = \frac{ml_r a_y + I_z \dot{\omega}_z}{l_f + l_r}$$

where:
$c_f$ is the front cornering stiffness parameter;
$c_r$ is the rear cornering stiffness parameter;
$\omega_z$ is the vehicle yaw rate;
$\dot{\omega}_z$ is the vehicle yaw acceleration;
$\delta$ is the vehicle steering wheel angle;
$l_f$ is the distance between the vehicle's center of gravity and the front axle;
$l_r$ is the distance between the vehicle's center of gravity and the rear axle;
$I_z$ is the vehicle yaw moment of inertia;
m is the mass of the vehicle;
$a_y$ is the lateral acceleration of the vehicle at its center of gravity.

The provision of the above description of the vehicle's lateral motion provides a base for the cornering stiffness estimation accounting for the effects of tire relaxation dynamics for providing an improved estimate.

According to a seventh embodiment the weighted linear least squares problem is formulated to provide an estimation of both the front cornering stiffness and the rear cornering stiffness of the vehicle.

The provision of formulating the weighted linear least squares problem to provide an estimation of both the front cornering stiffness and the rear cornering stiffness of the vehicle provides a first alternative approach for providing an improved cornering stiffness estimation taking into account the effects of tire relaxation dynamics.

According to an eighth embodiment the weighted linear least squares problem is formulated to provide an estimation of the front cornering stiffness only.

The provision of formulating the weighted linear least squares problem to provide an estimation of the front cornering stiffness only provides a second, more simple alternative approach for providing an improved cornering stiffness estimation taking into account the effects of tire relaxation dynamics if an estimation of the front cornering stiffness only is desired.

According to a ninth embodiment the method comprises a step of preprocessing the sensor data before using the data for providing the estimate of the cornering stiffness parameters.

The provision of preprocessing the sensor data before using the data for providing the estimate of the cornering stiffness parameters makes it possible to further improve the estimates through accounting for e.g. banked roads, low-$\mu$ surfaces, and periods of AYC or ABS interventions.

According to a tenth embodiment an arrangement for estimating one or more vehicle cornering stiffness parameters in a linear vehicle operating region comprises: a vehicle longitudinal velocity sensor for providing a vehicle longitudinal velocity signal; a vehicle lateral acceleration sensor for providing a vehicle lateral acceleration signal; a vehicle yaw rate sensor for providing a yaw rate signal of the vehicle, and a steering angle sensor for providing a steering angle signal of the vehicle; a cornering stiffness parameter observability determination unit arranged to determine from the read sensor data if the cornering stiffness parameters are observable; a cornering stiffness parameter estimation unit arranged to generate a cornering stiffness parameter signal using a bicycle model that includes a model of tire relaxation dynamics.

The provision of an arrangement for estimating one or more vehicle cornering stiffness parameters in a linear vehicle operating region as above provides for improved estimations of one or more vehicle cornering stiffness parameters in a linear vehicle operating region.

According to another embodiment a system for estimating one or more vehicle cornering stiffness parameters in a linear vehicle operating region of a vehicle comprises an arrangement for estimating vehicle cornering stiffness parameters in a linear vehicle operating region of the vehicle in accordance with the method as above.

A system as above facilitates the provision of improved estimations of one or more vehicle cornering stiffness parameters in a linear vehicle operating region in accordance with the method as above.

BRIEF DESCRIPTION OF THE DRAWINGS

In the following, embodiments herein will be described in greater detail by way of example only with reference to attached drawings, in which.

Still other features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
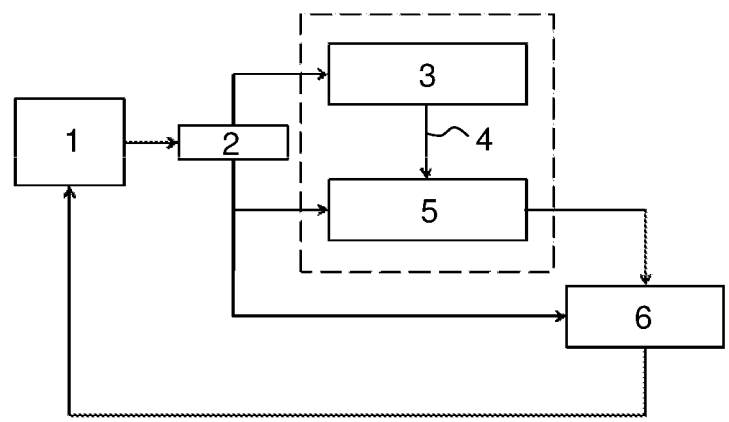
FIG. 1 is a schematic illustration of the proposed solution in a vehicle with sensors and a stability control system.

The present disclosure proposes, and illustrates in FIG. 1, within the dashed lines, a solution to the problem of estimating cornering stiffness in a vehicle 1 taking into account the effects of tire relaxation dynamics.

FIG. 1 illustrates schematically a vehicle 1 having a plurality of sensors 2 providing inputs to a cornering stiffness parameter estimation arrangement 3, 4, 5 according to embodiments herein. The cornering stiffness parameter estimation arrangement consists of two main parts, a Vehicle Excitation Monitor (VEM) 3 and a Cornering Stiffness Estimator (CSE) 5. The VEM 3 reads sensor 2 data, e.g. yaw rate $\omega_z$, lateral acceleration $a_y$, longitudinal velocity $v_x$ (normally derived from four wheel-speed signals) and steering wheel angle $\delta$, and determines whether or not the vehicle 1 is properly excited for the cornering stiffness estimation. If proper excitation is detected, the VEM 3 outputs a flag 4 that enables the CSE 5.

The CSE 5 is a model based estimator that estimates cornering stiffness using a single track vehicle model, hereafter referred to as bicycle model, which, in turn, includes a model of the tire relaxation dynamics. This leads to a least squares estimation problem that can be solved using e.g. Recursive Least Squares (RLS) techniques.

The sensors 2 also provide inputs to an active safety system 6, such as e.g. an Active Yaw Control (AYC) system, which also is arranged to receive one or more estimated cornering stiffness parameters ($c_f$, $c_r$) from the CSE 5 for online adaptation of a yaw rate reference model thereof.

Figure 2:
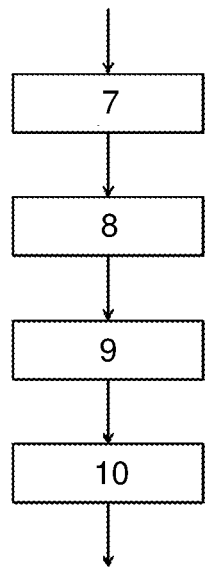
FIG. 2 is a schematic illustration of an overview of steps performed by an example embodiment of a cornering stiffness estimation of an arrangement for estimating one or more vehicle cornering stiffness parameters.

An overview of the different steps performed by the CSE 5 of the cornering stiffness parameter estimation arrangement 3, 4, 5 is provided in FIG. 2.

The CSE 5 of the FIG. 2 embodiment starts by a first step 7 of preprocessing the sensor data, e.g. filtering and compensation for bank angle, before performing a second step 8 of using the data in order to calculate the required quantities.

After this, the CSE 5 performs a third step 9 wherein it compensates for the tire relaxation dynamics before performing the estimation of the cornering stiffness parameters in a final step 10.

Figure 3:
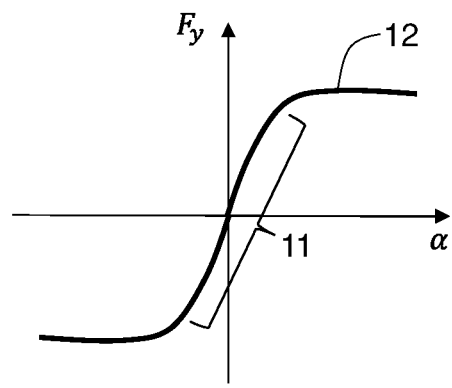
FIG. 3 is a schematic illustration of a plot of a curve expressing a lateral friction force applied by a tire to the ground as a function of a side slip angle.

The cornering stiffness of a tire of a vehicle 1 is, as well known to the person skilled in the art and illustrated schematically in FIG. 3, defined as being the gradient of an approximately linear section 11, on a plot of a curve 12 expressing a lateral friction force $F_y$ applied by a tire to the ground as a function of a side slip angle $\alpha$.

Prior art solutions do not account for tire relaxation dynamics in the estimation of cornering stiffness. These tire relaxation dynamics describe the fact that, in reality, there is a delay in the build-up of lateral tire forces due to the tire physics. This effect has a significant impact on a vehicle's cornering behavior and, as suggested herein, it will be beneficial if the tire relaxation dynamics are accounted for in active safety systems 6, such as e.g. Active Yaw Control (AYC) systems.

Cornering stiffness, as mentioned above, is a tire property that describes the cornering behavior of the tire by relating its side slip angle $\alpha$ to the produced lateral friction force $F_y$. The cornering stiffness may vary significantly for different tires, e.g. a summer tire vs. a winter tire or a low profile tire vs. a high profile tire, but it also varies as the tire ages. For active safety systems, such as e.g. AYC systems, these variations cause problems as the vehicle's true handling characteristics change over time which may cause unnecessary system interventions. Hence, it is known to estimate cornering stiffness online in order to counteract such issues.

The problems addressed herein primarily relate to the trade-off between robustness and performance of active safety systems 6, such as e.g. AYC systems. If cornering stiffness parameters are not estimated online, an AYC system needs to be tuned for a worst case scenario that, during many circumstances, may significantly deviate from the true behaviour of the vehicle, in order not to perform unnecessary interventions.

In order to provide improved cornering stiffness parameter estimates, it is hereby suggested to account also for tire relaxation dynamics in the estimation of cornering stiffness parameters. As mentioned, these tire relaxation dynamics describe the fact that, in reality, there is a delay in the build-up of lateral tire forces due to the tire physics having a significant impact on a vehicle's cornering behavior.

Thus, the present disclosure proposes a way to perform online cornering stiffness parameter estimation that could solve, or at least mitigate, the problems associated with tire relaxation dynamics.

In the following is described an approach for online cornering stiffness estimation that considers the effect of tire relaxation dynamics. The intended use is, as illustrated in FIG. 1, for online adaptation of a yaw rate reference model in active safety systems 6, such as e.g. Active Yaw Control (AYC) systems, in order to increase the robustness against effects originating from varying tire properties by adapting a yaw rate reference model to better describe the true behavior of the vehicle 1. Such an increase in robustness may allow for e.g. a larger freedom when calibrating thresholds and other parameters in an active safety system controller, such as e.g. an AYC system controller, without risking unnecessary interventions. Overall, this could lead to an overall performance benefit for active safety systems, such as e.g. Active Yaw Control (AYC) systems.

Figure 4:
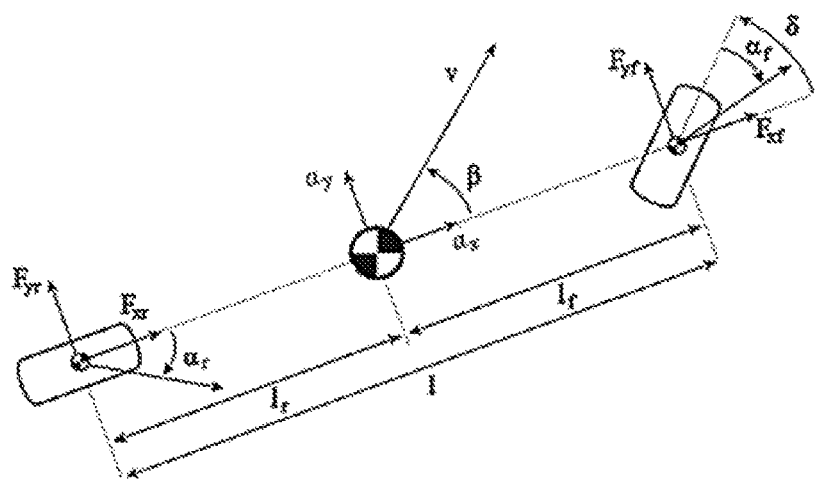
FIG. 4 is a schematic illustration of a standard bicycle model.

The estimation algorithm suggested herein and described later is based on a standard bicycle model, well known to the person skilled in the art and illustrated schematically in FIG. 4. Assuming constant, or at least slowly varying, longitudinal velocity and small angles, such a model describes the lateral motion of a vehicle according to $$ma_y = F_{yf} + F_{yr}$$

$$I_z \dot{\omega}_z = F_{yf} l_f - F_{yr} l_r \quad (2.1)$$

where m is the mass of the vehicle, $a_y$ is the lateral acceleration of the vehicle at its center of gravity, $F_{yf}$ and $F_{yr}$ are the front and rear lateral forces acting on the vehicle, $I_z$ is the vehicle's yaw moment of inertia, $\omega_z$ is the vehicle yaw rate while $l_f$ and $l_r$ correspond to the distance between the vehicle's center of gravity and the front and rear axle respectively. Solving for the lateral forces results in $$\begin{bmatrix} F_{yf} \\ F_{yr} \end{bmatrix} = \frac{1}{l_f + l_r} \begin{bmatrix} ml_r & I_z \\ ml_f & -I_z \end{bmatrix} \begin{bmatrix} a_y \\ \dot{\omega}_z \end{bmatrix} \quad (2.2)$$

Note that these forces are all assumed to act on the vehicle's body. In order to involve the cornering stiffness in this model it is necessary to look at the relation between the slip angle of the tire and the lateral tire force. In this context it is noted that the individual cornering stiffness, slip angle, and lateral tire force for the tires on each axle are commonly lumped together when using the bicycle model representation of the vehicle's lateral motion. This results in the aforementioned relation being described by $$F_{yf}^t = -c_f \alpha_f^t$$

$$F_{yr}^t = -c_r \alpha_r^t \quad (2.3)$$

for the front and rear axle respectively. Here, $c_f$ and $c_r$ are the front and rear cornering stiffness parameters, i.e. the total cornering stiffness of the front and rear axle, and $\alpha_f^t$ and $\alpha_r^t$ are the slip angles of the tires on the front and rear axle. It is noted that the superscript t indicates that the associated quantity is expressed in a tire coordinate system and not in a vehicle body coordinate system. The relationship between the tire coordinate system and the vehicle body coordinate system is illustrated schematically in FIG. 5.

Using simple geometry and trigonometry relations, the slip angles of the front and rear axle, $\alpha_f$ and $\alpha_r$ respectively, can be expressed in the coordinate system of the vehicle body as $$\alpha_f = \beta + \frac{\omega_z l_f}{v_x} - \delta \quad (2.4)$$

$$\alpha_r = \beta - \frac{\omega_z l_r}{v_x}$$

where $\beta$ is the side slip angle at the vehicle's center of gravity, $v_x$ is the vehicle's longitudinal velocity, and $\delta$ is the front wheel steering angle. In order to connect $\alpha_f$ and $\alpha_r$ to $\alpha_f^t$ and $\alpha_r^t$ it is necessary to define the concept of tire relaxation.

Figure 5:
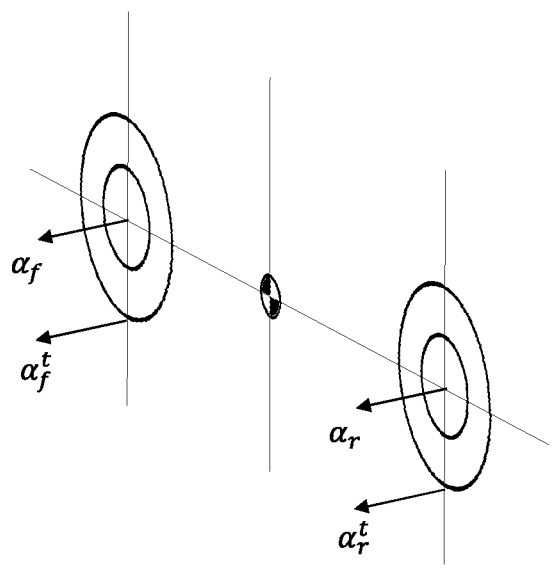
FIG. 5 is a schematic illustration of the relationship between a tire coordinate system and a vehicle body coordinate system in the standard bicycle model of FIG. 4.

The relaxation length of a tire is a property that describes the delay between when a slip angle $\alpha$ is introduced and when the resulting lateral force $F_y$ reaches its steady-state value. With this in mind, a simple model for the relation between $\alpha_f$ and $\alpha_f^t$ as well as between $\alpha_r$ and $\alpha_r^t$ is to, with a slight abuse of notation, introduce a first order filter according to $$\alpha_f^t = H(s) \alpha_f$$

$$\alpha_r^t = H(s) \alpha_r \quad (2.5)$$

where $$H(s) = \frac{1}{1 + s\tau} \quad (2.6)$$

and the notation with an exponent or superscript t, $(\text{term})^t$, indicates that the term is expressed in a tire coordinate system, according to FIG. 5.

Now, if it is assumed that the lateral forces acting on the vehicle body, i.e. $F_{yf}$ and $F_{yr}$, are equal to the lateral forces acting on the tires, i.e. $F_{yf}^t$ and $F_{yr}^t$, it is possible to rewrite the bicycle model description in (2.2) as $$\begin{bmatrix} -c_f H(s) \alpha_f \\ -c_r H(s) \alpha_r \end{bmatrix} = \frac{1}{l_f + l_r} \begin{bmatrix} ml_r & I_z \\ ml_f & -I_z \end{bmatrix} \begin{bmatrix} a_y \\ \dot{\omega}_z \end{bmatrix} \quad (2.7)$$

This expression can, in turn, be rewritten using the Equations for $\alpha_f$ and $\alpha_r$, resulting in a description of the vehicle's lateral motion defined as $$c_f H(s) \left( \delta - \omega_z \frac{l_f + l_r}{v_x} \right) + \frac{c_f (ml_f a_y - I_z \dot{\omega}_z)}{c_r (l_f + l_r)} = \frac{ml_r a_y + I_z \dot{\omega}_z}{l_f + l_r} \quad (2.8)$$

This description serves as a base for the cornering stiffness estimation algorithms described next.

Given the description of the vehicle's lateral motion derived in the previous section the aim is now to provide an algorithm that can estimate the cornering stiffness parameters online. This disclosure includes two similar algorithms, both based on recursive least squares. These algorithms are briefly described here along with some thoughts on identifiability.

The first algorithm, herein denoted as Algorithm 1, provides an estimation of both the front and rear cornering stiffness, i.e. both $c_f$ and $c_r$.

The description of the vehicle's lateral motion given above by Equation 2.8 is not linear in the front and rear cornering stiffness parameters $c_f$ and $c_r$ and can therefore not directly be treated as a linear regression problem. However, introducing $\theta_1 = c_f$ and $\theta_2 = c_f/c_r$ results in a parameter estimation problem that is linear in $\theta_1$ and $\theta_2$ according to $$y = \Phi^T \theta \quad (3.1)$$

where $$y = \frac{ml_r a_y + I_z \dot{\omega}_z}{l_f + l_r} \quad (3.2)$$

$$\Phi = \left[ H(s)\left( \delta - \omega_z \frac{l_f + l_r}{v_x} \right) \frac{(ml_f a_y + I_z \dot{\omega}_z)}{(l_f + l_r)} \right]^T$$

$$\theta = [\theta_1 \ \theta_2]^T$$

This estimation problem is solved using a standard recursive least squares (RLS) approach that calculates $\hat{\theta}_k$, the estimate of the parameter vector $\theta$ at time instance k, as $$\hat{\theta}_k = \hat{\theta}_{k-1} + K_k(y_k - \Phi^T \hat{\theta}_{k-1}) \quad (3.3)$$

In order to minimize a weighted least squares criterion. In the above Equation 3.3, the estimation update gain at time instance k, $K_k$, and the estimation covariance matrix at time instance k, $P_k$, are calculated according to $$K_k = \frac{P_{k-1}\Phi}{\lambda I + \Phi^T P_{k-1} \Phi} \quad (3.4)$$

$$P_k = \frac{1}{\lambda}(I - K_k \Phi^T)P_{k-1}$$

Here, I is an identity matrix of conformable size, and $0 < \lambda \leq 1$ is a forgetting factor that regulates how newly acquired samples are weighted against old information. A small $\lambda$ value results in new samples having a relatively high impact on the resulting estimates compared to the information from previous samples. If the value of $\lambda$ is equal to one, all samples are given equal weight and no information will hence be forgotten. For the person skilled in the art it is also worth pointing out that RLS is really a special case of a Kalman filter.

The second algorithm, herein denoted as Algorithm 2, provides an estimation of the front cornering stiffness $c_f$ only.

For the application of adapting the yaw rate reference model of an active safety system 6, such as e.g. Active Yaw Control (AYC) system, it may not be necessary to estimate the front and rear cornering stiffness, i.e. $c_f$ and $c_r$ individually. The reason is that it is really the difference between them, roughly corresponding to the understeer gradient, i.e. a measure of how the steering needed for a steady turn changes as a function of lateral acceleration, which affects the overall yaw motion. Hence, if the front cornering stiffness $c_f$ is the only parameter of interest to estimate then the rear cornering stiffness $c_r$ can be kept constant and the description (Equation 2.8) serving as a base for the cornering stiffness estimation algorithms is once again a linear in the estimation parameters. Note that the resulting parameter estimate only provides a reflection of the true value of the front cornering stiffness $c_f$ if the true rear cornering stiffness $c_r$ value coincides with the constant value used in the estimation. Otherwise this algorithm, herein denoted as Algorithm 2, is actually closer to being an understeer gradient estimation algorithm.

This estimation problem is solved in exactly the same manner as outlined in Algorithm 1 (Equations 3.1-3.4), the only difference being that $\Phi$ and $\theta$ now are scalars and defined according to $$\Phi = H(s)\left(\delta - \omega_z \frac{l_f + l_r}{v_x}\right) + \frac{(ml_f a_y + I_z \dot{\omega}_z)}{c_r(l_f + l_r)} \quad (3.5)$$

$$\theta = c_f$$

It is noted that the rear cornering stiffness $c_r$ in the above definition, according to Equation 3.5, is, in this case, a constant and thus no longer an estimated parameter.

In the following are presented some thoughts on identifiability.

The RLS algorithm, described in previous sections, solves a weighted linear least squares problem in order to estimate the cornering stiffness parameters $c_f$ and $c_r$. To find a unique solution to this problem it is vital that the estimated parameters are observable from the output of the system. For the RLS problem formulation in Equation 3.1 above, this means that $\Phi^T$ needs to have full column rank, i.e. the two columns of $\Phi^T$ in Algorithm 1 need to be linearly independent and $\Phi \neq 0$ in Algorithm 2. In order to guarantee that these conditions for observability are met it is necessary to exclude specific driving scenarios. For instance, if the vehicle is moving straight forward without any yaw motion, lateral acceleration, or steering input, it is clear from Equations 3.2 and 3.5 that the observability conditions are not fulfilled. This is a quite natural result since it can be considered difficult to estimate the cornering behavior of a vehicle while it is moving straight ahead.

For the purpose of making sure that the cornering stiffness parameters are observable a number of conditions on the measured signals are introduced. These conditions include:

Minimum longitudinal velocity $v_{xmin}$ in order not to introduce numerical difficulties. This as a bicycle model normally is not valid for low velocities.

Maximum lateral acceleration $a_{ymax}$ in order to make sure that the tires are operating within their linear region.

Minimum steering angle $\delta_{min}$ and/or minimum yaw rate $\omega_{zmin}$ in order to make sure that the system is properly excited.

It may also be necessary to introduce additional conditions, like the ones above, in the future in order to handle real world difficulties such as banked roads, low-$\mu$ surfaces, and periods of AYC or ABS interventions.

Thus, in general terms, a method for estimating one or more vehicle 1 cornering stiffness parameters $c_f$, $c_r$ in a linear vehicle 1 operating region 11, according to embodiments herein comprises the steps of: reading sensor 2 data representative of at least vehicle 1 longitudinal velocity $v_x$, vehicle 1 lateral acceleration $a_y$, vehicle 1 yaw rate $\omega_z$ and vehicle 1 steering angle $\delta$; determining from the read sensor 2 data if the cornering stiffness parameters $c_f$, $c_r$ are observable; and if so providing an estimate of the cornering stiffness parameters $c_f$, $c_r$ using a bicycle model that includes a model of tire relaxation dynamics.

In some embodiments the step of determining cornering stiffness parameter $c_f$, $c_r$ observability further comprises: determining if the vehicle 1 longitudinal velocity $v_x$ exceeds a minimum threshold $v_{xmin}$; determining if the vehicle 1 lateral acceleration $a_y$ is below a maximum threshold $a_{ymax}$; determining if the vehicle 1 yaw rate $\omega_z$ exceeds a minimum threshold $\omega_{zmin}$; and determining if the vehicle 1 steering angle $\delta$ exceeds a minimum threshold $\delta_{min}$.

In further embodiments the step of providing an estimate of the cornering stiffness parameters $c_f$, $c_r$ further comprises formulating and solving a weighted linear least squares problem using a standard recursive least squares approach.

In still further embodiments the weighted linear least squares problem, in order to involve the cornering stiffness parameters $c_f$, $c_r$ and tire relaxation dynamics, is formulated based on a description of the vehicle's lateral motion that includes a relation between a slip angle $\alpha_f$, $\alpha_r$ and a lateral tire force $F_{yf}$, $F_{yr}$ at the center of a tire and a slip angle $\alpha_f^t$, $\alpha_r^t$ and a lateral tire force $F_{yf}^t$, $F_{yr}^t$ at the point of contact between that tire and the road.

In accordance with yet further embodiments the description of the vehicle's lateral motion includes a first order filter model for the relation between the slip angle $\alpha_f$, $\alpha_r$ and the lateral tire force $F_{yf}$, $F_{yr}$ at the center of a tire and the slip angle $\alpha_f^t$, $\alpha_r^t$ and the lateral tire force $F_{yf}^t$, $F_{yr}^t$ at the point of contact between that tire and the road according to:

$$\alpha_f^t = H(s)\alpha_f$$

$$\alpha_r^t = H(s)\alpha_r$$

where $$H(s) = \frac{1}{1+s\tau}$$

and the notation with an exponent or superscript t, (term)$^t$, indicates that the term is expressed in a tire coordinate system.

According to further embodiments herein the description of the vehicle's lateral motion is defined as $$c_f H(s)\left(\delta - \omega_z \frac{l_f + l_r}{v_x}\right) + \frac{c_f(ml_f a_y - I_z \dot{\omega}_z)}{c_r(l_f + l_r)} = \frac{ml_r a_y + I_z \dot{\omega}_z}{l_f + l_r}$$

where:

$c_f$ is the front cornering stiffness parameter; $c_r$ is the rear cornering stiffness parameter; $\omega_z$ is the vehicle yaw rate; $\dot{\omega}_z$ is the vehicle yaw acceleration; $\delta$ is the vehicle steering wheel angle; $l_f$ is the distance between the vehicle's center of gravity and the front axle; $l_r$ is the distance between the vehicle's center of gravity and the rear axle; $I_z$ is the vehicle yaw moment of inertia; m is the mass of the vehicle; $a_y$ is the lateral acceleration of the vehicle at its center of gravity.

According to still further embodiments the weighted linear least squares problem is formulated to provide an estimation of both the front cornering stiffness $c_f$ and the rear cornering stiffness $c_r$ of the vehicle 1, in accordance with Algorithm 1.

According to yet further embodiments the weighted linear least squares problem is formulated to provide an estimation of the front cornering stiffness $c_f$ only, in accordance with Algorithm 2.

According to further embodiments the method comprises a step of preprocessing the sensor 2 data before using the data for providing the estimate of the cornering stiffness parameters $c_f$, $c_r$.

Further embodiments herein, as illustrated in FIG. 1, also relate to an arrangement 3, 4, 5 for estimating one or more vehicle 1 cornering stiffness parameters $c_f$, $c_r$ in a linear vehicle 1 operating region 11, that comprises: a vehicle 1 longitudinal velocity sensor 2 for providing a vehicle longitudinal velocity signal; a vehicle 1 lateral acceleration sensor 2 for providing a vehicle 1 lateral acceleration signal; a vehicle 1 yaw rate sensor 2 for providing a yaw rate signal of the vehicle 1, and a steering angle sensor 2 for providing a steering angle signal of the vehicle 1; a cornering stiffness parameter observability determination unit 3 arranged to determine from the read sensor 2 data if the cornering stiffness parameters $c_f$, $c_r$ are observable; a cornering stiffness parameter $c_f$, $c_r$ estimation unit 5 arranged to generate a cornering stiffness parameter $c_f$, $c_r$ signal using a bicycle model that includes a model of tire relaxation dynamics.

Those of ordinary skill in the art will understand that the cornering stiffness parameter estimation arrangement 3, 4, 5, the cornering stiffness parameter observability determination unit 3, the cornering stiffness parameter estimation unit 5, and any other device, unit, controller, module, system and/or any step, function or operation described herein, may comprise or be provided by one or more microprocessors, microcontrollers, programmable digital signal processors (DSP) or other programmable device. Such units, devices, controllers, modules, systems, steps, functions and/or operations may also, or instead, comprise or be provided by an application specific integrated circuit (ASIC), a programmable gate array or programmable array logic, a programmable logic device, or a digital signal processor (DSP). Where the unit, device, controller, module, system, step, function or operation comprises or is provided by a programmable device such as a microprocessor, microcontroller or programmable digital signal processor, the device, unit, controller, module, system, step, function or operation may further comprise or be provided by a memory or storage for storing computer executable code executable by the programmable device, unit, controller, module or system for controlling operation thereof and/or for performing the particular algorithm(s) described herein by performing the steps, functions and/or operations also described herein.

It should be noted that vehicle 1 longitudinal velocity sensor 2 functionality normally relies on four wheel-speed signals that are used to generate the vehicle 1 longitudinal velocity.

Still yet further embodiments herein also relate to a system for estimating one or more vehicle 1 cornering stiffness parameters $c_f$, $c_r$ in a linear vehicle 1 operating region 11 of a vehicle 1, that comprises an arrangement 3, 4, 5 for estimating vehicle 1 cornering stiffness parameters $c_f$, $c_r$ in a linear vehicle 1 operating region of the vehicle 1 in accordance with the method described herein.

The improved cornering stiffness parameter $c_f$, $c_r$ estimates, provided in accordance with the method described herein, in addition to being useful for adapting a yaw rate reference model of active safety systems 6, such as e.g. Active Yaw Control (AYC) systems, in order to better describe the true behavior of the vehicle 1, it is also envisaged that the improved cornering stiffness parameter $c_f$, $c_r$ estimates provided in accordance with the method described herein will be beneficial for autonomously controlled vehicles, e.g. where a camera obtains the geometry of the road ahead of the autonomous vehicle whereupon this geometry is passed through a yaw rate reference model for producing a desired vehicle yaw rate to be used for autonomous control, taking into account the effects of tire relaxation dynamics.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for estimating one or more vehicle cornering stiffness parameters in a linear operating region of a vehicle, the method comprising:
retrieving from a vehicle longitudinal velocity sensor, a vehicle lateral acceleration sensor, a vehicle yaw rate sensor, and a vehicle steering angle sensor data representative of at least a vehicle longitudinal velocity, a vehicle lateral acceleration, a vehicle yaw rate, and a vehicle steering angle;
sending the sensor data representative of at least the vehicle longitudinal velocity, the vehicle lateral acceleration, the vehicle yaw rate and the vehicle steering angle to a control system;
determining, by the control system, from the sensor data when vehicle cornering stiffness parameters are observable; and
when vehicle cornering stiffness parameters are observable, generating, by the control system, a cornering stiffness parameter signal based on an estimate of the cornering stiffness parameters provided using a bicycle model that includes a model of tire relaxation dynamics describing the delay between when a slip angle is introduced and when a resulting lateral force reaches a steady state value.

2. The method according to claim 1 wherein determining cornering stiffness parameter observability further comprises:
determining if the vehicle longitudinal velocity exceeds a minimum threshold;
determining if the vehicle lateral acceleration is below a maximum threshold;
determining if the vehicle yaw rate exceeds a minimum threshold; and
determining if the vehicle steering angle exceeds a minimum threshold.

3. The method according to claim 1 wherein providing the estimate of the cornering stiffness parameters further comprises formulating and solving a weighted linear least squares problem using a standard recursive least squares approach.

4. The method according to claim 3 wherein the weighted linear least squares problem, in order to involve the cornering stiffness parameters and tire relaxation dynamics, is formulated based on a description of a lateral motion of the vehicle that includes a relation between a first slip angle and a first lateral tire force at a center of a tire and a second slip angle and a second lateral tire force at a point of contact between the tire and a road surface.

5. The method according to claim 4 wherein the description of the vehicle lateral motion includes a first order filter model for the relation between the first slip angle and the first lateral tire force at the center of the tire and the second slip angle and the second lateral tire force at the point of contact between the tire and the road surface according to $$\alpha_f^t = H(s)\alpha_f$$

$$\alpha_r^t = H(s)\alpha_r$$

where $$H(s) = \frac{1}{1+s\tau}$$

and the notation with an exponent or superscript t, (term)$^t$, indicates that the term is expressed in a tire coordinate system.

6. The method according to claim 4 wherein the description of the lateral motion of the vehicle is defined as $$c_f H(s)\left(\delta - \omega_z \frac{l_f + l_r}{v_x}\right) + \frac{c_f(ml_f a_y - I_z \dot{\omega}_z)}{c_r(l_f + l_r)} = \frac{ml_r a_y + I_z \dot{\omega}_z}{l_f + l_r}$$

where $c_f$ is the front cornering stiffness parameter; $c_r$ is the rear cornering stiffness parameter; $\omega_z$ is the vehicle yaw rate; $\dot{\omega}_z$ is the vehicle yaw acceleration; $\delta$ is the vehicle steering wheel angle; $l_f$ is the distance between a vehicle center of gravity and the front axle; $l_r$ is the distance between the vehicle center of gravity and the rear axle; $I_z$ is the vehicle yaw moment of inertia; m is the mass of the vehicle; $v_x$ is the longitudinal velocity of the vehicle; and $a_y$ is the lateral acceleration of the vehicle at the vehicle center of gravity.

7. The method according to claim 3 wherein the weighted linear least squares problem is formulated to provide an estimation of both a front cornering stiffness and a rear cornering stiffness of the vehicle.

8. The method according to claim 3 wherein the weighted linear least squares problem is formulated to provide an estimation of a front cornering stiffness only.

9. The method of claim 1 further comprising preprocessing the sensor data before using the sensor data for providing the estimate of the cornering stiffness parameters.

10. An arrangement for estimating one or more vehicle cornering stiffness parameters in a linear operating region of a vehicle, the arrangement comprising:
a vehicle longitudinal velocity sensor for providing a vehicle longitudinal velocity signal;
a vehicle lateral acceleration sensor for providing a vehicle lateral acceleration signal;
a vehicle yaw rate sensor for providing a yaw rate signal of the vehicle;
a steering angle sensor for providing a steering angle signal of the vehicle;
a cornering stiffness parameter observability determination unit arranged to determine from the sensor data when vehicle cornering stiffness parameters are observable; and
a cornering stiffness parameter estimation unit arranged to generate, when vehicle cornering stiffness parameters are observable, a cornering stiffness parameter signal using a bicycle model that includes a model of tire relaxation dynamics describing the delay between when a slip angle is introduced and when a resulting lateral force reaches a steady state value.

11. A system for estimating one or more vehicle cornering stiffness parameters in a linear operating region of a vehicle, the system comprising:
a vehicle longitudinal velocity sensor for providing a vehicle longitudinal velocity signal;
a vehicle lateral acceleration sensor for providing a vehicle lateral acceleration signal;

a vehicle yaw rate sensor for providing a yaw rate signal of the vehicle;
a steering angle sensor for providing a steering angle signal of the vehicle;
a control system comprising a processor and associated memory storing computer executable instructions, wherein the instructions when executed by the processor cause the processor to read sensor data including the vehicle longitudinal velocity signal, the vehicle lateral acceleration signal, the yaw rate signal and the steering angle signal;
  determine from the sensor data read when vehicle cornering stiffness parameters are observable; and
  when vehicle cornering stiffness parameters are observable, generate a cornering stiffness parameter signal based on an estimate of the cornering stiffness parameters provided using a bicycle model that includes a model of tire relaxation dynamics describing the delay between when a slip angle is introduced and when a resulting lateral force reaches a steady state value.

* * * * *